United States Patent [19]  
Partanen

[11] 4,437,896  
[45] Mar. 20, 1984

[54] SYNTHETIC ASPHALT MIXTURES AND PROCESSES FOR MAKING THEM

[76] Inventor: John F. Partanen, 612 W. Kiva Ave., Mesa, Ariz. 85202

[21] Appl. No.: 465,013

[22] Filed: Feb. 8, 1983

Related U.S. Application Data

[63] Continuation-in-part of Ser. No. 432,091, Sep. 30, 1982, abandoned, which is a continuation-in-part of Ser. No. 268,363, May 29, 1981, abandoned.

[51] Int. Cl.³ .............................................. C08L 95/00
[52] U.S. Cl. ........................... 106/273 R; 106/281 R; 106/277; 524/59; 524/62
[58] Field of Search ............... 106/273 R, 281 R, 277; 524/59, 60, 62

[56] References Cited

U.S. PATENT DOCUMENTS

| | | | |
|---|---|---|---|
| 3,867,162 | 2/1975 | Elste, Jr. | 106/277 |
| 4,018,730 | 4/1977 | McDonald | 106/277 |
| 4,073,659 | 2/1978 | Burris | 106/277 |
| 4,094,696 | 6/1978 | Burris | 106/277 |
| 4,193,815 | 3/1980 | Burris | 106/202 |

*Primary Examiner*—John Kight, III
*Assistant Examiner*—Amelia B. Yarbrough
*Attorney, Agent, or Firm*—H. Gordon Shields

[57] ABSTRACT

Synthetic asphalt mixtures comprise selective blends of tall oil and/or tall oil pitch and naturally occurring or man-made gilsonite.

20 Claims, No Drawings

SYNTHETIC ASPHALT MIXTURES AND PROCESSES FOR MAKING THEM

CROSS-REFERENCE TO RELATED APPLICATIONS

This application is a continuation-in-part application of copending application Ser. No. 432,091, filed Sept. 30, 1982, now abandoned, which was a continuation-in-part of Ser. No. 268,363, filed May 29, 1981, and now abandoned.

BACKGROUND OF THE INVENTION

1. Field of the Invention

This invention relates to synthetic asphalt, and more particularly, to the process for making synthetic asphalt by selectively blending gilsonite with tall oil and/or tall oil pitch.

2. Description of the Prior Art

Asphalt is typically made of petroleum products, and includes two components, asphaltenes, or petroleum resins, and maltenes, or heavy oils. The asphaltenes are generally dispersed and melted in the maltenes or heavy oils. There are two primary factors in the manufacture of petroleum asphalts which generally determine the grade of the asphalts. They are the proportion of asphaltenes to the maltenes and the viscosity of the maltenes.

There are three ways of classifying petroleum asphalts. The first classification is penetration at 25° C., according to ASTM procedures D-5 and D-946. The second classification is asphalt-cement viscosity, or AC grade, according to ASTM procedures D-2171 and D-3381. The third classification is aged residue viscosity after subjecting the asphalt to oxidation in a rolling thin film oven, or AR-grade, according to ASTM procedures D-2872 and D-3381.

The cost of petroleum asphalt, and petroleum base asphalt recycling agents, has risen sharply in the past few years. Current costs cause the repair of existing asphalt roadways and the construction of new asphalt roadways to be rather expensive. It is likely that such costs will continue to rise. The availability of man-made, or synthetic, asphalt mixtures, and synthetic asphalt recycling agents, produced and marketable at lower costs per ton than equivalent petroleum base products, should help relieve some of the prohibitive costs of the petroleum based asphalts.

SUMMARY OF THE INVENTION

Gilsonite, natural occurring or man-made, is mixed with tall oils and/or tall oil pitches to produce synthetic asphalt. The proportion of the gilsonite to tall oil and/or tall oil pitch determines the specific properties of the synthetic asphalt.

Among the objects of the present invention are the following:

To provide a new and useful process for making synthetic asphalt;

To provide new and useful mixtures of gilsonite and tall oil;

To provide new and useful combinations of gilsonite and tall oil pitch for making synthetic asphalt; and To provide new and useful blends of gilsonite and tall oil products to produce synthetic asphalt products.

DESCRIPTION OF THE PREFERRED EMBODIMENT INTRODUCTION

The present invention describes synthetic asphalt, and synthetic asphalt recycling mixtures, equivalent to asphalts and recycling agents for asphalt roadways obtained from the refining of crude petroleum oils. In the synthetic asphalts, gilsonite, a mineral resource, or man-made gilsonite, a refined bituminous product, replaces the asphaltenes, and tall oil pitch, a waste residue from the destructive distillation of pine and poplar trees, in various viscosities, replaces the maltenes. Petroleum recycling agents are mainly maltenes, with some petroleum asphalt added to make various grades. Synthetic asphalt recycling agents may be obtained from selective blending of tall oils and tall oil pitches with small amounts of gilsonite to make equivalent grades to the petroleum based agents currently available.

Tall oil is a fatty, resinous liquid obtained as a by-product from wood pulp, a residue from the destructive distillation of wood from certain pine and poplar trees. Tall oil pitch is the residue remaining after tall oil is distilled. It is generally considered to be a waste product, although it may be used as a fuel. However, when used as a fuel, it has inherent problems due to its odor, its smoke characteristics, and its pre-heat requirements. The use for tall oil pitch set forth herein provides a positive use for what may be considered generally as a waste product.

Gilsonite is an asphaltite sometimes referred to as uintaite. It is also referred to as soft coal. One of its current uses is in the manufacture of paints and varnishes. It may also be mixed with asphalt and other chemicals as an additive. For illustration of the latter use, reference may be made to U.S. Pat. Nos. 4,073,659, 4,094,696, and 4,193,815.

Man-made gilsonite, such as a flaked asphaltene residuum product from ROSE (Residuum Oil Supercritical Extraction) process petroleum refining units, and natural occurring gilsonite are chemically similar or essentially identical compounds. The ROSE process is a patented process for refining crude petroleum oil. The solvent extraction bituminous residuum is a bituminous compound which is essentially a waste by-product of the process. As used herein, the term "gilsonite" includes both the natural occurring mineral product and the man-made bituminous product.

To produce a synthetic asphalt mixture, five percent to sixty percent by weight of gilsonite is melted and dispersed into ninety-five percent to forty percent by weight of tall oil, or tall oil pitch, at temperatures of 160° C. to 260° C. The exact proportion of gilsonite and tall oil, or tall oil pitch, depends on the grade of synthetic asphalt to be made, and the viscosity of the tall oil, or tall oil pitch. High viscosity tall oil pitches require less gilsonite than do low viscosity tall oil pitches, and tall oils. The temperature required to synthesize the asphalt is dependent on the temperature at which the gilsonite melts.

Synthetic asphalt mixtures may be produced that will conform to the classifications and grades set forth above for petroleum asphalts by varying the percent by weight of gilsonite used, and/or by varying the viscosity of the tall oil, or tall oil pitch, and the percent by weight of the tall oil, or tall oil pitch used.

Petroleum asphalt suitable for waterproofing roofs is usually produced by oxidizing petroleum asphalt, or by extracting maltenes from petroleum asphalt. Roofing petroleum based asphalts are characteristically low in penetration, and have high softening-point temperatures. Equivalent low penetration synthetic asphalts with high softening-point temperatures may be produced by increasing the percent by weight of gilsonite used, and by varying the viscosity of the tall oil, or tall oil pitch used with the gilsonite.

Petroleum based asphalt pavement recycling agents are produced by extracting asphaltenes from petroleum asphalts, or from specific distillation ranges from the refining of crude petroleum oils. Tall oils, and tall oil pitches may be blended, with the addition of small proportions of gilsonite to produce synthetic asphalt pavement recycling agents conforming to the various grades of petroleum base agents.

In the various examples in the sections set forth below, various ASTM standards, specifications, and test procedures, etc. are referred to. Some of them are without discussion or explanation, and some are with discussion and explanation. However, what is referred to in all cases will be understood by those skilled in the art.

I. SYNTHETIC ASPHALT MIXTURES

EXAMPLE 1

A synthetic asphalt mixture equivalent to an AC-2.5 was produced. A tall oil pitch with a viscosity of 60 poises at 60° C. was used. Gilsonite crushed into particles less than 850 microns in size, and melting at less than 250° C. was used. Ninety percent by weight of the tall oil pitch was combined with ten percent by weight of the gilsonite and reacted at 260° C. for thirty minutes. The mixture was agitated during the reaction period to disperse the melting gilsonite throughout the tall oil pitch. The mixture was allowed to cool after the reaction period and was then tested. Test results were as follows:

| | |
|---|---|
| Original Absolute Viscosity at 60° C. | = 265 poises |
| Softening Point, Ring and Ball | = 38° C. |
| Brittle Point | = 5° C. |
| Tests on Residue from RTFC: | |
| Absolute Viscosity at 60° C. | = 584 poises |
| Oxidation Ratio | = 2.20 |

EXAMPLE 2

A synthetic asphalt mixture equivalent to an AR-100 was produced. A tall oil pitch with a viscosity of 15 poises at 60° C. was used. Gilsonite crushed into particles less than 850 microns in size and melting at less than 250° C. was used. Eighty percent by weight of the tall oil pitch was combined with twenty percent by weight of the gilsonite and reacted at 260° C. for thirty minutes. The mixture was agitated during the reaction period to disperse the melting gilsonite throughout the tall oil pitch. The mixture was allowed to cool after the reaction period, and then tested. Test results were as follows:

| | |
|---|---|
| Original Absolute Viscosity at 60° C. | = 319 poises |
| Flash Point, Cleveland Open Cut | = 262° C. |
| Penetration of Original Mixture at 25° C. | = 147 dmm |
| Softening Point, Ring & Ball | = 42° C. |
| Brittle Point | = 3° C. |
| Tests on Residue from RTFC: | |
| Absolute Viscosity at 60° C. | = 774 poises |
| Penetration at 25° C. | = 62 dmm |
| Oxidation Ratio | = 2.43 |
| Penetration Ratio | = 0.42 |
| Solubility in Trichlorethylene | = >99% |

EXAMPLE 3

A synthetic asphalt mixture equivalent to an AC-5 or an AR-1000 was produced. A tall oil pitch with a viscosity of 60 poises at 60° C. was used. Gilsonite crushed into particles less than 850 microns in size and melting at less than 250° C. was used. Eighty-five percent by weight of the tall oil pitch was combined with fifteen percent by weight of the gilsonite and they were reacted at 260° C. for thirty minutes. The mixture was agitated during the reaction period to disperse the melting gilsonite throughout the tall oil pitch. The mixture was allowed to cool after the reaction period and was then tested. Test results were as follows:

| | |
|---|---|
| Original Absolute Viscosity at 60° C. | = 567 poises |
| Flash Point, Cleveland Open Cup | = 261° C. |
| Penetration of Original Mixture at 25° C. | = 129 dmm |
| Softening Point, Ring & Ball | = 42° C. |
| Brittle Point | = 3° C. |
| Tests on Residue from RTFC: | |
| Absolute Viscosity at 60° C. | = 1171 poises |
| Penetration 25 25° C. | = 83 dmm |
| Oxidation Ratio | = 2.07 |
| Penetration Ratio | = 0.64 |
| Solubility in Trichlorethylene | = >99% |

EXAMPLE 4

A synthetic asphalt mixture equivalent to an AR-1000 was produced. A tall oil pitch with a viscosity of 213 poises at 60° C. was used. Gilsonite crushed into particles less than 850 microns in size and melting at less than 250° was used. Ninety-two percent by weight of the tall oil pitch was combined with eight percent by weight of the gilsonite and they were reacted at 260° C. for thirty minutes. The mixture was allowed to cool after the reaction period and was then tested. Test results were as follows:

| | |
|---|---|
| Original absolute viscosity at 60° C. | = 676 poises |
| Flash Point, Cleveland Open Cup | = 263° C. |
| Penetration of Original Mixture at 25° C. | = 94 dmm |
| Softening Point, Ring & Ball | = 45° C. |
| Brittle Point | = 3° C. |
| Tests on Residue from RTFC: | |
| Absolute Viscosity at 60° C. | = 1126 poises |
| Penetration at 25° C. | = 61 dmm |
| Oxidation Ratio | = 1.67 |
| Penetration Ratio | = 0.65 |
| Solubility in Trichlorethylene | = >99% |

EXAMPLE 5

A synthetic asphalt mixture equivalent to an AC-15 was produced. A tall oil pitch with a viscosity of 213 poises at 60° C. was used. Gilsonite crushed into particles less than 850 microns in size, and melting at less than 250° C. was used. Eighty-eight percent by weight of the tall oil pitch was combined with twelve percent by weight of the gilsonite and they were reacted at 260° C. for thirty minutes. The mixture was agitated during the reaction period to disperse the melting gilsonite throughout the tall oil pitch. The mixture was allowed to cool after the reaction period and was then tested. Test results were as follows:

| Original Absolute Viscosity at 60° C. | = 1479 poises |
|---|---|
| Flash Point, Cleveland Open Cup | = 264° C. |
| Penetration of Original Mixture at 25° C. | = 65 dmm |
| Softening Point, Ring & Ball | = 47° C. |
| Brittle Point | = 3° C. |
| Tests on Residue from RTFC: | |
| Absolute Viscosity at 60° C. | = 2856 poises |
| Penetration at 25° C. | = 49 dmm |
| Oxidation Ratio | = 1.93 |
| Penetration Ratio | = 0.75 |
| Solubility in Trichlorethylene | = >99% |

EXAMPLE 6

A synthetic asphalt mixture equivalent to an AC-15 or to an AR-4000 was produced. A tall oil pitch with a viscosity of 60 poises at 60° C. was used. Gilsonite crushed into particles less than 850 microns in size, and melting at less than 250° C. was used. Eighty percent by weight of the tall oil pitch was combined with twenty percent by weight of the gilsonite and they were reacted at 250° C. for thirty minutes. The mixture was agitated during the reaction period to disperse the melting gilsonite throughout the tall oil pitch. The mixture was allowed to cool after the reaction period and was then tested. Test results were as follows:

| Original Absolute Viscosity at 60° C. | = 1452 poises |
|---|---|
| Flash Point, Cleveland Open Cup | = 260° C. |
| Penetration of Original Mixture at 25° C. | = 67 dmm |
| Softening Point, Ring & Ball | = 43° |
| Brittle Point | = 40° |
| Tests on Residue from RTFC: | |
| Absolute Viscosity at 60° C. | = 3314 poises |
| Penetration at 25° C. | = 49 dmm |
| Oxidation Ratio | = 2.28 |
| Penetration Ratio | = 0.73 |
| Solubility in Trichlorethylene | = >99% |

EXAMPLE 7

A synthetic asphalt mixture equivalent to an AR-4000 was produced. A tall oil pitch with a viscosity of 113 poises at 60° C. was used. Gilsonite crushed into particles less than 850 microns in size and melting at less than 250° C. was used. Eighty-three percent by weight of the tall oil pitch was combined with seventeen percent by weight of the gilsonite and they were reacted at 250° C. for thirty minutes. The mixture was agitated during the reaction period to disperse the melting gilsonite throughout the tall oil pitch. The mixture was allowed to cool after the reaction period and was then tested. Test results were as follows:

| *Original Absolute Viscosity at 60° C. | = 1862 poises |
|---|---|
| *Flash Point, Cleveland Open Cup | = 283° C. |
| *Penetration of Original Mixture at 25° C. | = 59 dmm |
| *Softening Point, Ring & Ball | = 46° C. |
| *Brittle Point | = 2° C. |
| Tests on Residue from RTFC: | |
| *Absolute Viscosity at 60° C. | = 3935 poises |
| *Penetration at 25° C. | = 47 dmm |
| *Oxidation Ratio | = 2.11 |
| *Penetration Ratio | = 0.797 |
| *Heat Loss | = $7.00 \times 10^{-4}$% |
| *Ductility at 25° C. | = 78 cm |

*These test results courtesy of Huntway Refining Co., 1651 Alameda St., Wilmington, California 90744.

EXAMPLE 8

A synthetic asphalt mixture equivalent to an AR-4000 was produced. A tall oil pitch with a viscosity of 15 poises at 60° C. was used. Gilsonite crushed into particles less than 850 microns in size and melting at less than 259° C. was used. Seventy-five percent by weight of the tall oil pitch was combined with twenty-five percent by weight of the gilsonite and they were reacted at 260° C. for thirty minutes. The mixture was agitated during the reaction period to disperse the melting gilsonite throughout the tall oil pitch. The mixture was allowed to cool after the reaction period and was then tested. Test results were as follows:

| Original Absolute Viscosity at 60° C. | = 1008 poises |
|---|---|
| Flash Point, Cleveland Open Cup | = 262° C. |
| Penetration of Original Mixture at 25° C. | = 79 dmm |
| Softening Point, Ring & Ball | = 46° C. |
| Brittle Point | = 3° C. |
| Tests on Residue from RTFC: | |
| Absolute Viscosity at 60° C. | = 3383 poises |
| Penetration at 25° C. | = 35 dmm |
| Oxidation Ratio | = 3.36 |
| Penetration Ratio | = 0.44 |

EXAMPLE 9

A synthetic asphalt mixture equivalent to an AR-16,000 was produced. A tall oil pitch with a viscosity of 60 poises at 60° C. was used. Gilsonite crushed into particles less than 850 microns in size, and melting at less than 250° C. was used. Seventy-five percent by weight of the tall oil pitch was combined with twenty-five percent by weight of the gilsonite and they were reacted at 250° C. for thirty minutes. The mixture was agitated during the reaction period to disperse the melting gilsonite throughout the tall oil pitch. The mixture was allowed to cool after the reaction period and was then tested. Test results were as follows:

| Original Absolute Viscosity at 60° C. | = 5005 poises |
|---|---|
| Flash Point, Cleveland Open | = 265° C. |

-continued

| Cup | |
|---|---|
| Penetration of Original Mixture at 25° C. | = 42 dmm |
| Softening Point, Ring & Ball | = 49° C. |
| Brittle Point | = 10° C. |
| Tests on Residue from RTFC: | |
| Absolute Viscosity at 60° C. | = 15,413 poises |
| Penetration at 25° C. | = 18 dmm |
| Oxidation Ratio | = 3.08 |
| Penetration Ratio | = 0.37 |

EXAMPLE 10

A synthetic asphalt mixture equivalent to an AR-16,000 was produced. A tall oil pitch with a viscosity of 15 poises at 60° C. was used. Gilsonite crushed into particles less than 850 microns in size, and melting at less than 250° C. was used. Seventy percent by weight of the tall oil pitch was combined with thirty percent by weight of the gilsonite and they were reacted at 260° for thirty minutes. The mixture was agitated during the reaction period to disperse the melting gilsonite throughout the tall oil pitch. The mixture was allowed to cool after the reaction period and was then tested. Test results were as follows:

| Original Absolute Viscosity at 60° C. | = 4042 poises |
|---|---|
| Flash Point, Cleveland Open Cup | = 263° C. |
| Penetration of Original Mixture at 25° C. | = 56 dmm |
| Softening Point, Ring and Ball | = 51° C. |
| Brittle Point | = 9° C. |
| Tests on Residue from RTFC: | |
| Absolute viscosity at 60° C. | = 19,555 poises |
| Penetration at 25° C. | = 16 dmm |
| Oxidation Ratio | = 4.83 |
| Penetration Ratio | = 0.29 |

EXAMPLE 11

A synthetic asphalt mixture equivalent to Type I Roofing Asphalt was produced. A tall oil pitch with a viscosity of 15 poises at 60° C. was used. Gilsonite crushed into particles less than 850 microns in size, and melting at less than 250° C. was used. Sixty-five percent by weight of the tall oil pitch was combined with thirty-five percent by weight of the gilsonite and they were reacted at 260° C. for thirty minutes. The mixture was agitated during the reaction period to disperse the melting gilsonite throughout the tall oil pitch. The mixture was allowed to cool after the reaction period and was then tested. Test results were as follows:

| Softening Point, Ring and Ball | = 61° C. |
|---|---|
| Penetration at 25° C. | = 52 dmm |

EXAMPLE 12

A synthetic asphalt mixture equivalent to Type II Roofing Asphalt was produced. A tall oil pitch with a viscosity of 15 poises at 60° C. was used. Gilsonite crushed into particles less than 850 microns in size and melting at less than 250° C. was used. Sixty percent by weight of the tall oil pitch was combined with forty percent by weight of the gilsonite and they were reacted at 260° C. for thirty minutes. The mixture was agitated during the reaction period to disperse the melting gilsonite throughout the tall oil pitch. The mixture was allowed to cool after the reaction period and was then tested. Test results were as follows:

| Softening Point, Ring and Ball | = 71° C. |
|---|---|
| Penetration at 25° C. | = 38 dmm |

II. SYNTHETIC ASPHALT PAVEMENT RECYCLING MIXTURES

EXAMPLE 1

A synthetic mixture equivalent to asphalt pavement rejuvenator oil was produced. A tall oil with a kinematic viscosity of 20 centistokes at 60° C. was used. A tall oil pitch with a kinematic viscosity of 1378 centistokes at 60° C. was also used. Forty percent by weight of the tall oil was combined with sixty percent by weight of the tall oil pitch at 120° C. The mixture was agitated to disperse the two components completely and was then allowed to cool. The mixture was tested and compared with an asphalt pavement rejuvenator oil currently available nationwide. Test results were as follows:

| Rejuvenator Oil Type | Kinematic Viscosity at 60° C. | Flash Point Cleveland Open |
|---|---|---|
| Synthetic Mixture | 176.8 Centistokes | 219° C. |
| Reclamite Base Oil | 153.6 Centistokes | 191° C. |

EXAMPLE 2

Synthetic mixtures equivalent to RA-5 asphalt recycling agent were produced. A tall oil with a kinematic viscosity of 20 centistokes at 60° C. was used. A tall oil pitch with a kinematic viscosity of 1378 centistokes at 60° C. was used. Thirty-five percent by weight of the tall oil was combined with sixty-five percent by weight of the tall oil pitch at 120° C. The mixture was agitated to disperse the two components completely and was then allowed to cool. Similar mixtures were made using thirty percent by weight of the tall oil combined with seventy percent by weight of the tall oil pitch, twenty-five percent by weight of the tall oil combined with seventy-five percent by weight of the tall oil pitch, and twenty percent by weight of the tall oil combined with eighty percent by weight of the tall oil pitch. These four mixtures were tested after cooling and were compared with an RA-5 asphalt pavement recycling agent currently available nationwide. Test results were as follows:

| Recycling Agent Oil Type | Kinematic Viscosity at 60° C. | Flash Point Clev. Open Cup | Oxidation Ratio |
|---|---|---|---|
| 35% tall oil, 65% tall oil pitch | 233.4 centistokes | 219° C. | 1.50 |
| 30% tall oil, 70% tall oil pitch | 288.4 centistokes | 219° C. | 1.51 |
| 25% tall oil, 75% tall oil pitch | 331.4 centistokes | 219° C. | 1.48 |
| 20% tall oil, 80% tall oil pitch | 370.5 centistokes | 219° C. | 1.51 |
| Cyclogen L (RA-5) | 231.7 centistokes | 205° C. | 1.67 |

EXAMPLE 3

A synthetic mixture equivalent to RA-25 asphalt recycling agent was produced. A tall oil pitch with a kinematic viscosity of 1378 centistokes at 60° C. was used. Gilsonite crushed into particles less than 850 microns in size and melting at less than 250° C. was used. Ninety-five percent by weight of the tall oil pitch was combined with five percent by weight of the gilsonite and they were reacted at 260° C. for thirty minutes. The mixture was agitated during the reaction period to disperse the melting gilsonite throughout the tall oil pitch. The mixture was allowed to cool after the reaction period and was then tested and compared with an RA-25 asphalt pavement recycling agent currently available nationwide. Test results were as follows:

| Recycling Agent Oil Type | Kinematic Viscosity at 60° C. | Flash Point Clev. Open Cup | Oxidation Ratio |
|---|---|---|---|
| Synthetic RA-25 | 2660 Centistokes | 262° C. | 1.41 |
| Cyclogen M (RA-25) | 1272 Centistokes | 221° C. | 1.68 |

EXAMPLE 4

A synthetic mixture equivalent to an RA-75 asphalt recycling agent was produced. A tall oil pitch with a kinematic viscosity of 1378 centistokes at 60° C. was used. Gilsonite crushed into particles less than 850 microns in size and melting at less than 250° C. was used. Ninety percent by weight of the tall oil pitch was combined with ten percent by weight of the gilsonite and they were reacted at 260° C. for thirty minutes. The mixture was agitated during the reaction period to disperse the melting gilsonite throughout the tall oil pitch. The mixture was allowed to cool after the reaction period and was then tested and compared with an RA-75 asphalt recycling agent currently available nationwide. Test results were as follows:

| Recycling Agent Oil Type | Kinematic Viscosity at 60° C. | Flash Point Clev. Open Cup | Oxidation Ratio |
|---|---|---|---|
| Synthetic RA-75 | 5152 Centistokes | 262° C. | 1.39 |
| Cyclogen H (RA-75) | 5212 Centistokes | 221° C. | 1.69 |

State of Arizona specifications for asphalt rejuvenator and recycling agents are as follows:

| Type Oil | Kinematic Viscosity at 60° C. | Flash Point COC | Oxidation Ratio |
|---|---|---|---|
| PR | 100 to 200 centistokes | — | — |
| RA-5 | 200 to 800 centistokes | 204° C. | Less than 3.00 |
| RA-25 | 1000 to 4000 centistokes | 219° C. | Less than 3.00 |
| RA-75 | 5000 to 8000 centistokes | 219° C. | Less than 3.00 |

The synthetic asphalt and the synthetic asphalt pavement recycling agent mixtures may be used exactly like the equivalent asphalts and recycling agents obtained from refining crude petroleum oils. The synthetic mixtures may be used to produce hot-mixed pavements. They are emulsifiable, they may be used to produce asphalt-rubber mixtures, and they may be used to rejuvenate and recycle old asphalt pavements.

III. HOT-MIXED ASPHALT CEMENT MIX DESIGN USING A SYNTHETIC ASPHALT

A synthetic asphalt equivalent to an AR-4000 petroleum asphalt was used. An aggregate was selected and analyzed through standard Tyler mesh sieves. The term "aggregate" is used herein in its common, well-known sense, and as defined in ASTM Part 15, Procedure B-8. Generally, aggregate may be granular material of mineral composition, such as sand, gravel, shell, slag, cinders, or crushed stone. Aggregate is typically used in the repair and construction of roads, parking lots, and the like. Sieve analysis of the aggregate was as follows:

| Tyler Sieve Size | Percent Passing |
|---|---|
| ⅜ | 100.0 |
| #4 | 55.0 |
| #10 | 16.0 |
| #40 | 9.0 |
| #200 | 6.0 |

Two 1200 g samples of the aggregate were heated to 177° C. for two hours. The synthetic AR-4000 asphalt and a sample of AR-4000 petroleum asphalt were heated to 149° C. Five percent by weight, or 60 g, of the synthetic AR-4000 asphalt was added to one of the 1200 g aggregate samples and mixed until a uniform coating was achieved on the aggregate. This mixture was then placed in a Marshall Mold and given 50 blows on each side with a Marshall compactor in accordance with ASTM procedure D-1559. The compacted sample was then removed from mold and was allowed to cool to room temperature. The second 1200 g aggregate sample was prepared the same way using the AR-4000 petroleum asphalt. After both samples had reached room temperature, they were immersed in a water bath at 60° C. for thirty minutes. The samples were then removed and compressed on a Marshall press in accordance with ASTM procedure D-1559 and were then analyzed for stability and flow. Test results were as follows:

| Sample | Stability in Pounds | Flow |
|---|---|---|
| Synthetic AR-4000 Asphalt | 2291 | 22 |
| AR-4000 Petroleum Asphalt | 1985 | 14 |

IV. SYNTHETIC ASPHALT EMULSIONS

EXAMPLE 1

SS-lh was made from a synthetic AR-4000 asphalt. A pre-saponified solution of fifty percent by weight of Vinsol resin and seven percent by weight of sodium hydroxide was used. Vinsol resin is a lignin sulfonate amine emulsifier. An aqueous emulsifying solution was prepared consisting of seven percent by weight of the pre-saponified Vinsol solution with a final pH of 11.5. The synthetic AR-4000 asphalt and emulsifying solution were combined into an emulsion using a colloidal mill. The synthetic asphalt emulsion was fifty-nine and eight-tenths percent by weight synthetic AR-4000, one and four-tenths percent by weight Vinsol resin, two-tenths percent by weight sodium hydroxide, and thirty-eight and six-tenths percent by weight water.

EXAMPLE 2

CSS-lh was made from a synthetic AR-4000 asphalt. An aqueous emulsifying solution of two percent by weight of Arosurf AA-57 (tallow di-quaternary ammonium chloride) two percent by weight of nonylphenol, with fifty moles of ethylene oxide, and five hundredths percent by weight of hydrochloric acid was prepared with a final pH of 4.5. The synthetic AR-4000 asphalt and emulsifying solution were combined into an emulsion using a colloidal mill. The synthetic asphalt emulsion was fifty-seven percent by weight synthetic AR-5000, eighty-six hundredths percent by weight Arosurf AA-57, eighty-six hundredths percent by weight nonylphenol, two hundredths percent by weight hydrochloric acid, and forty-one and twenty-six hundredths percent by weight water.

EXAMPLE 3

RS-2 was made from a synthetic AR-1000 asphalt. An aqueous emulsifying solution of one percent by weight of Proctor and Gamble T-22 Tallow, a refined beef fat emulsifier, thirty-three hundredths percent by weight of Sodium hydroxide, and five hundredths percent by weight of oleic acid was prepared with a final pH of 12. The synthetic AR-1000 asphalt and emulsifying solution were combined into an emulsion using a colloidal mill. The synthetic asphalt emulsion was sixty-seven percent by weight synthetic AR-1000, three hundred thirty thousandths percent by weight T-22 Tallow, one hundred ninety thousandths percent by weight sodium hydroxide, one hundred seven thousandths percent by weight oleic acid, and thirty-two and five hundred forty-four thousandths percent by weight water.

EXAMPLE 4

CRS-2 was made from a synthetic AR-1000 asphalt. An aqueous emulsifying solution of two percent by weight of Armak E-5, dodecyl-trimethyl ammonium chloride, a quaternary ammonium chloride emulsifying agent, and one percent by weight hydrochloric acid was prepared with a final pH of 1.5. The synthetic AR-1000 asphalt and emulsifying solution were combined into an emulsion using a colloidal mill. The synthetic asphalt emulsion was sixty-eight and five hundred thousandths percent by weight synthetic AR-1000, six hundred thirty thousandths percent by weight E-5, three hundred fifteen thousandths percent by weight hydrochloric acid, and thirty and five hundred fifty-five thousandths percent by weight water.

EXAMPLE 5

An emulsion suitable as a protective coating for metals and build-up roofs was made from a gilsonite tall oil pitch composition equivalent to a Type I roofing asphalt. Bentonite and chromic acid were used as emulsifying agents. An aqueous emulsifying solution of five and one half percent by weight bentonite clay, forty-five hundredths percent by weight chromic acid, and ninety-four and five hundredths percent by weight water was prepared with a final Ph of 5.2. The gilsonite tall oil pitch composition and emulsifying solution were combined into an emulsion using a colloidal mill. The emulsion obtained was thirty-nine and eight tenths percent by weight gilsonite tall oil pitch composition, two and one-half percent by weight bentonite clay, twenty-five hundredths percent by weight chromic acid, and fifty-seven and forty-five hundredths percent by weight water.

Each of the four example emulsions conform to test outlines in ASTM procedure D-244. Further examples of emulsions possible from synthetic asphalts should be evident to chemists and technicians skilled in the art of manufacturing asphalt emulsions.

V. MIX DESIGN USING CSS-1h SYNTHETIC ASPHALT EMULSION

An aggregrate suitable for base stabilization was selected and analyzed through standard Tyler mesh sieves. Sieve analysis was as follows:

| Tyler Sieve Size | Percent Passing |
| --- | --- |
| ½ | 100.0 |
| ⅜ | 95.4 |
| #4 | 80.4 |
| #8 | 58.9 |
| #16 | 44.4 |
| #30 | 24.3 |
| #50 | 15.7 |
| #100 | 5.6 |
| #200 | Trace |

Three 1200 g samples of the aggregate were assembled. Six percent by weight of water was added to each sample and mixed throughout the samples to wet the aggregate. Seven percent by weight of emulsion was also added to each sample. The first sample received CSS-1h prepared from petroleum base AR-4000 asphalt. The second sample received SS-1h prepared from petroleum base AR-4000 asphalt. The third sample received CSS-1h prepared from synthetic AR-4000 asphalt. The resulting mixtures were stirred to completely disperse the emulsions through the wetted aggregate samples. Each mixture was placed in a Marshall mold and given 50 blows on each side with a Marshall compactor in accordance with ASTM procedure D-1559. The compacted samples were removed from the molds and were allowed to cure for seven days at room temperature. On the seventh day each sample was tested on a Marshall press in accordance with ASTM procedure D-1559 for stability and flow. Test results were as follows:

| Sample | Stability in Pounds | Flow |
| --- | --- | --- |
| CSS-lh from petroleum asphalt | 4040 | 15 |
| SS-lh from petroleum asphalt | 3833 | 18 |
| CSS-lh from synthetic asphalt | 3814 | 20 |

VI. SYNTHETIC ASPHALT-RUBBER, AND SYNTHETIC ASPHALT MODIFIED ASPHALT-RUBBER MIXTURES

EXAMPLE 1

A synthetic asphalt-rubber mixture was made. A tall oil pitch with a viscosity of sixty poises at 60° C. was used. Gilsonite crushed into particles less than 850 microns in size and melting at less than 250° C. was used. Seventy-five and eight tenths percent by weight of the tall oil pitch was combined with twenty-four and two tenths percent by weight of the gilsonite, and they were reacted at 260° C. for thirty minutes. This mixture was agitated during the reaction period to disperse the melting gilsonite throughout the tall oil pitch. The resulting synthetic asphalt was allowed to cool to 204° C. Seventy-seven percent by weight of the synthetic asphalt was combined with three percent by weight of rubber extender oil, and twenty percent by weight of reclaimed rubber scrap less than 850 microns in size. The term "reclaimed rubber" is used herein in its common, ordinary, and well-known connotation in the art. It is simply rubber originally used for one purpose and then "reclaimed" from scrap rubber and used for another purpose. In the art, it is sometimes referred to as ground down or crumb rubber. Typically, the primary source of reclaimed rubber is worn-out automotive tires. The source produce may be buffed, ground, etc., to render the source from its original condition or state to its reclaimed ground down or crumb state. The mixture of synthetic asphalt, rubber extender oil, and reclaimed rubber was reacted for two hours at 204° C., during which time it was tested every twenty minutes. Results of these tests are as follows:

| Time | Viscosity at 204° C. | Softening Point | Brittle Point |
|---|---|---|---|
| 20 minutes | 1200 cps | 57° C. | −2° C. |
| 40 minutes | 1200 cps | 56° C. | −3° C. |
| 60 minutes | 1250 cps | 56° C. | −5° C. |
| 80 minutes | 1150 cps | 56° C. | −5° C. |
| 100 minutes | 1050 cps | 54° C. | −4° C. |
| 120 minutes | 900 cps | 53° C. | −4° C. |

The average viscosity at 204° C. was 1358 cps. The average softening point was 55° C. The average brittle point was −4° C. A petroleum asphalt-rubber mixture currently available nationwide has an average viscosity at 204° C. of 1643 cps, an average softening point of 58° C., and an average brittle point of −4° C.

EXAMPLE 2

A synthetic asphalt modified, asphalt-rubber mixture suitable for extremely cold climates was made. A tall oil with a kinematic viscosity of 21.3 centistokes at 60° C. was used. Gilsonite crushed into particles less than 850 microns in size, and melting at less than 200° C. was used. Reclaimed rubber scrap in particles less than 850 microns was used. An AC-5 petroleum asphalt from Anchorage, Alaska was used. In this system, tall oil, gilsonite, reclaimed rubber, and AC-5 petroleum asphalt combine to form a paving mixture suitable for use in extremely cold regions. Twenty-five percent by weight of the tall oil, five percent by weight of the gilsonite, twenty percent by weight of the AC-5 petroleum asphalt were combined and reacted at 204° C. for two hours. During the two hours, the mixture was tested every twenty minutes. Test results were as follows:

| Time | Viscosity at 204° C. | Softening Point | Brittle Point |
|---|---|---|---|
| 20 minutes | 1650 cps | 40° C. | −28° C. |
| 40 minutes | 1450 cps | 38° C. | −25° C. |
| 60 minutes | 1350 cps | 37° C. | −26° C. |
| 80 minutes | 1200 cps | 36° C. | −26° C. |
| 100 minutes | 1100 cps | 35° C. | −26° C. |
| 120 minutes | 1100 cps | 33° C. | −26° C. |

EXAMPLE 3

A synthetic asphalt modified, asphalt-rubber mixture suitable for general use was made. A tall oil with a kinematic viscosity of 21.3 centistokes at 60° C. was used. Gilsonite crushed into particles less than 850 microns in size and melting at less than 200° C. was used. Reclaimed rubber scrap in particles less than 850 microns was used. An AR-8000 petroleum asphalt from Santa Maria, Calif. was used. In this system, the tall oil, gilsonite, reclaimed rubber, and AR-8000 petroleum asphalt were combined to form a paving mixture suitable for general use. Ten percent by weight of the tall oil, five percent by weight of the gilsonite, twenty-percent by weight of the reclaimed rubber, and sixty-five percent by weight of the AR-8000 petroleum asphalt were combined and reacted at 204° C. for two hours. During the two hours, the mixture was tested every twenty minutes. Test results were as follows:

| Time | Viscosity at 204° C. | Softening Point | Brittle Point |
|---|---|---|---|
| 20 minutes | 1750 cps | 62° C. | −8° C. |
| 40 minutes | 1600 cps | 62° C. | −11° C. |
| 60 minutes | 1550 cps | 63° C. | −12° C. |
| 80 minutes | 1600 cps | 62° C. | −12° C. |
| 100 minutes | 1600 cps | 61° C. | −12° C. |
| 120 minutes | 1600 cps | 60° C. | −12° C. |

VII. MIX DESIGN USING SYNTHETIC ASPHALT PAVEMENT RECYCLING AGENTS

EXAMPLE 1

A hot recycling agent using synthetic RA-5 was made. A sample of old pulverized asphalt pavement was selected that was suitable for use with RA-5 recycling agent. A sample of synthetic recycling agent equivalent to an RA-5 and a sample of petroleum base RA-5 (Witco Chemical Company Cyclogen L) were used. Two 1200 g samples of old pulverized asphalt pavement and the recycling agents were tested to 120° C. One percent by weight of synthetic RA-5 recycling agent was added to the first 1200 g pavement sample. One percent by weight of the Cyclogen L petroleum base RA-5 recycling agent was added to the second 1200 g pavement sample. Each pavement sample and recycling agent mixture was stirred to achieve uniform dispersement. The mixtures were then placed in Marshall molds and each received 50 blows on each side with a Marshall compactor in accordance with ASTM procedure D-1559. The compacted samples were removed from the molds and allowed to cure at room temperature for three days. The two samples were then tested on a Marshall press in accordance with ASTM procedure D-1559 and analyzed for stability and flow. Results were as follows:

| Sample No. | Type Recycling Agent | Stability in Pounds | Flow |
|---|---|---|---|
| 1 | Synthetic RA-5 | 4936 | 24 |
| 2 | Cyclogen L | 4837 | 24 |

EXAMPLE 2

A hot recycling agent using synthetic RA-25 was made. A sample of old, pulverized asphalt pavement, to which about twenty percent by weight of virgin sand and stone had been added, suitable for use with RA-25 recycling agent, was selected. Samples of synthetic RA-25 and petroleum base RA-25 (Witco Chemical Company Cyclogen M), were used. Two 1200 g samples of the old, pulverized asphalt pavement with the virgin aggregate and the recycling agents were heated to 120° C. One percent by weight of the synthetic RA-25 recycling agent was added to the first pavement sample, and one percent by weight of the Cyclogen M was added to the second pavement sample. Each pavement sample and recycling agent mixture was stirred to achieve uniform dispersement. The mixtures were then placed in Marshall molds and they received fifty blows on each side with a Marshall compactor in accordane with ASTM procedure D-1559. The compacted samples were removed from the molds and allowed to cure at room temperature for three days. The two samples were then tested on a Marshall press in accordance with ASTM procedure D-1559 and analyzed for stability and flow. Results were as follows:

| Sample No. | Test Recycling Agent | Stability in Pounds | Flow |
|---|---|---|---|
| 1 | Synthetic RA-25 | 5715 | 27 |
| 2 | Cyclogen M | 4240 | 23 |

VIII. SYNTHETIC ASPHALT PAVEMENT REJUVENATOR AND RECYCLING AGENT EMULSIONS

EXAMPLE 1

An emulsified synthetic asphalt pavement rejuvenator was made. An aqueous emulsifying solution of four percent by weight nonylphenol emulsifying agent, such as Emery Industries NP-507, with fifty moles of ethylene oxide and four tenths percent by weight hydrochloric acid was prepared with a final pH of 2.0. Synthetic pavement rejuvenator and the emulsifying solution were combined using a colloidal mill. The emulsifyed synthetic asphalt pavement rejuvenator obtained was fifty-nine and twenty hundredths percent nonylphenol, sixteen hundredths percent by weight hydrochloric acid, and thirty-nine and one hundredths percent by weight water.

EXAMPLE 2

An emulsified synthetic RA-5 recycling agent was made. An aqueous emulsifying solution of four percent (4%) by weight nonylphenol with fifty moles of ethylene oxide and four tenths percent (0.4%) by weight hydrochloric acid was prepared with a final pH of 2.0. Synthetic RA-5 recycling agent and the emulsifying solution were combined using a colloidal mill. The emulsified synthetic RA-5 recycling agent obtained was sixty-two and twenty hundredths percent by weight synthetic RA-5 recycling agent, one and fifty-one hundredths percent by weight nonylphenol, fifteen hundredths percent by weight hydrochloric acid, and thirty-six and four tenths percent by weight water.

EXAMPLE 3

An emulsified synthetic RA-25 recycling agent was made. An aqueous emulsifying solution of four percent by weight nonylphenol with fifty moles of ethylene oxide and four-tenths percent by weight hydrochloric acid was prepared with a final pH of 2.0. Synthetic RA-25 recycling agent and the emulsifying solution were combined using a colloidal mill. The emulsified synthetic RA-25 recyclcling agent obtained was sixty-one and eighty hundredths percent by weight synthetic RA-25 recycling agent, one and fifty-three hundredths percent by weight nonylphenol, fifteen hundredths percent by weight hydrochloric acid, and thirty-six and fifty-two hundredths percent by weight water.

EXAMPLE 4

An emulsified synthetic RA-75 recycling agent was made. An aqueous emulsifying solution of four percent by weight nonylphenol with fifty moles of ethylene oxide and four tenths percent by weight hydrochloric acid was prepared with a final pH of 2.0. Synthetic RA-75 recycling agent and the emulsifying solution were combined using a colloidal mill. The emulsified synthetic RA-75 recycling agent obtained was sixty and seventy hundredths percent by weight synthetic RA-75 recycling agent, one and fifty-seven hundredths percent by weight nonyphenol, sixteen hundredths percent by weight hydrochloric acid and thirty-seven and fifty-seven hundredths percent by weight water.

IX. PAVEMENT REJUVENATION USING EMULSIFIED SYNTHETIC PAVEMENT REJUVENATOR

An emulsified synthetic pavement rejuvenator (see Section VIII, Example 1) was diluted two parts to one part water. A sample of petroleum base emulsified pavement rejuvenator (Witco Chemical Company Reclamite) was diluted in the same manner. A section of old asphalt pavement was selected and two six-inch diameter circles were inscribed within the section using a crayon. Eight ml of the diluted emulsified synthetic pavement rejuvenator was poured over the area of pavement inscribed in one of the circles and was spread uniformly with a small paint brush. The diluted Reclamite was spread in the same manner within the other inscribed circle. Seventeen minutes were required for the diluted emulsified synthetic pavement rejuvenator to penetrate into the asphalt pavement and sixteen minutes were required for the diluted Reclamite pavement rejuvenator to penetrate. This procedure is the Spot Test method for determining the amount and rate of absorption of pavement rejuvenator into asphalt pavements recommended by Witco Chemical Company. Witco Chemical Company recommends a rate of application in gallons per square yard that will be absorbed within fifteen to twenty minutes. Comparable results were achieved with the diluted emulsified petroleum base pavement rejuvenator (Reclamite) and the diluted emulsified synthetic pavement rejuvenator at an application rate of about one-tenth gallon per square yard.

X. MIX DESIGN USING EMULSIFIED SYNTHETIC ASPHALT PAVEMENT RECYCLING AGENTS

EXAMPLE 1

A cold recycling agent using emulsified synthetic RA-5 (See Section VIII, Example 2) was made. A sample of old pulverized asphalt pavement was selected that was suitable for use with emulsified synthetic RA-5. A sample of emulsified synthetic RA-5 and a sample of emulsified petroleum base RA-5 (Witco Chemical Company, Cyclogen LE) were used. Two 1200 g samples of the old pulverized asphalt pavement were prepared. One and seven-tenths percent (1.7%) by weight of the emulsified synthetic RA-5 was added to the first sample, and one and seven-tenths percent (1.7%) by weight of the Cyclogen LE was added to the second sample. Each sample was stirred at ambient temperature to achieve uniform dispersement. The mixtures were then placed in Marshall molds and they received fifty blows on each side with a Marshall compactor in accordance with ASTM Procedure D-1559. The compacted samples were removed from the molds and allowed to cure for four (4) days at room temperature. The two samples were then tested on a Marshall press in accordance with ASTM Procedure D-1559 and were analyzed for stability and flow. Results were as follows:

| Sample No. | Type Recycling Agent | Stability in Pounds | Flow |
|---|---|---|---|
| 1 | Synthetic ERA-5 | 4939 | 18 |
| 2 | Cyclogen LE | 3189 | 17 |

EXAMPLE 2

A cold recycling agent using emulsified synthetic RA-25 was made. A sample of old pulverized asphalt pavement to which about twenty percent by weight of virgin sand and stone had been added, suitable for use with emulsified RA-25, was selected. A sample of emulsified synthetic RA-25 and a sample of emulsified petroleum base RA-25 (Witco Chemical Company Cyclogen ME) were used. Two (2) 1200 g samples of the old pulverized asphalt pavement with the virgin aggregate were prepared. Two and seven-tenths percent by weight of the emulsified synthetic RA-25 was added to the first sample, and two and seven-tenths percent by weight of the Cyclogen ME was added to the second sample. Each sample was stirred at ambient temperature to achieve uniform dispersement. The mixtures were then placed in Marshall molds and they received fifty blows on each side with a Marshall compactor in accordance with ASTM procedure D-1559. The compacted samples were removed from the molds and allowed to cure four days at room temperature. The two samples were then tested on a Marshall press in accordance with ASTM procedure D-1559 and analyzed for stability and flow. Results were as follows:

| Sample No. | Type Recycling Agent | Stability in Pounds | Flow |
|---|---|---|---|
| 1 | Synthetic ERA-25 | 2505 | 16 |
| 2 | Cyclogen ME | 1798 | 21 |

XI. LIQUID, OR CUT-BACK, SYNTHETIC ASPHALTS

Liquid, or cut-back, petroleum asphalts are prepared from various grades of petroleum asphalts diluted with blends of petroleum ether, kerosene, and diesel oils. The various grades and classes of liquid, or cut-back petroleum asphalts, and their specifications, are outlined in Part 15, ASTM, D-2026, D-2027, and D-2028.

Liquid, or cut-back, petroleum asphalts have been widely used in the past for road construction and repair, and for manufacturing roof cements and adhesives. Recently their use has been heavily restricted by state and federal agencies dealing with energy conservation and environmental protection. The reasons for these restrictions are that the solvents used to prepare the liquid or cut-back petroleum asphalts are fuels, and are also photo-chemically octine, or smog forming. It is anticipated that such liquid or cut-back petroleum asphalts may soon be banned altogether.

Liquid, or cut-back, synthetic asphalts may be prepared from the same solvents as petroleum asphalts. Of more interest is the fact that nearly equivalent grades and classes of liquid or cut-back synthetic asphalts may be prepared using alcohols, including glycol ethers, polyethylene glycols, and polypropylene glycols. The term "alcohol" as used herein may be defined as a liquid hydroxy derivative of a hydrocarbon containing a specific atomic arrangement known as a carbinol group. This definition includes polyhydric alcohols, such as glycol ethers, polyethylene glycols, polypropylene glycols, and glycols in general. Liquid, or cut-back, synthetic asphalts prepared with such alcohol solvents would not be subject to the restrictions previously mentioned.

EXAMPLE 1

A liquid, or cut-back, synthetic asphalt equivalent to an SC-800 was prepared. A synthetic AR-1000 asphalt, prepared from fifteen percent by weight of gilsonite and eighty-five percent by weight of tall oil pitch with a viscosity of 60 poises at 60° C., was used. Ninety percent by weight of the synthetic AR-1000 asphalt was combined with ten percent by weight of Dow Polyglycol E-200, (polyethylene glycol with an average molecular weight of 200), at 125° C. The mixture was allowed to cool and then tested. Results are as follows:

| Kinematic viscosity at 60° C. | 1221 Centistokes |
|---|---|
| Flash Point, Cleveland Open Cup | 171° C. |

EXAMPLE 2

A liquid, or cut-back, synthetic asphalt equivalent to an MC-250 was prepared. A synthetic AR-1000 asphalt, prepared from fifteen percent by weight of gilsonite and eighty-five percent by weight of tall oil pitch with a viscosity of 60 poises at 60° C., was used. Seventy-five percent by weight of the synthetic AR-1000 asphalt was combined with fifteen percent by weight of Dow Polyglycol P-1200, (polypropylene glycol with an average molecular weight of 1200), and ten percent by weight of isobutyl alcohol, at 75° C. The mixture was allowed to cool and then tested. Results are as follows:

| Kinematic viscosity at 60° C. | 262 Centistokes |
|---|---|
| Flash Point, Cleveland Open Cup | 80° C. |

EXAMPLE 3

A liquid, or cut-back synthetic asphalt equivalent to an RC-250 was prepared. A synthetic AR-4000 asphalt, prepared from seventeen percent by weight of gilsonite and eighty-three percent by weight of tall oil pitch with a viscosity of 113 poises at 60° C., was used. Seventy-five percent by weight of the synthetic AR-4000 asphalt was combined with twenty-five percent by weight of isobutyl alcohol at 75° C. The mixture was allowed to cool and then tested. Results are as follows:

| | |
|---|---|
| Kinematic viscosity at 60° C. | 253 centistokes |
| Flash Point, Cleveland Open Cup | 80° C. |

Further examples and formulations should be evident to technicians and chemists skilled in the art.

XII. PRODUCTS PREPARED FROM LIQUID, OR CUT-BACK, SYNTHETIC ASPHALTS

EXAMPLE 1

A stockpile, or cold patch mixture useful for road repairs was prepared from a liquid, or cut-back, synthetic asphalt equivalent to an MC-250 and ⅜ inch aggregate. A synthetic AR-4000 asphalt prepared from seventeen percent by weight of gilsonite melted and dispersed in eighty-three percent by weight of tall oil pitch with a viscosity of 113 poises at 60° C. was diluted with twenty percent by weight of isobutyl alcohol. Nine percent by weight of the synthetic MC-250 was then combined with ninety-one percent by weight of the ⅜ inch aggregate at 60° C. The mixture was stirred so that all the aggregate was uniformly coated. The mixture exhibited good storage stability over several weeks, yet would quickly cure when used to repair pot-holes and other imperfections in asphalt pavements.

EXAMPLE 2

A plastic roof cement was prepared from a synthetic asphalt equivalent to a Type I roofing asphalt diluted with isobutyl alcohol and polypropylene glycol, mineral fillers, and fiber. Twenty-four percent by weight of gilsonite was combined with seventy-six percent by weight of tall oil pitch with a viscosity of 113 poises at 60° C. This mixture was heated to 260° C. for thirty minutes and agitated to disperse the melting gilsonite. The mixture was allowed to cool at 150° C. Fifty-seven and one-half percent by weight of the synthetic Type I roofing asphalt produced was then diluted with seven and one-half percent by weight of Dow Polyglycol P-1200 (polypropylene glycol with an average molecular weight of 1200). Twenty-five percent by weight of 16 micron talc was then added and stirred into the mixture. With the temperature of the mixture below 125° C., two and one-half percent of Lexter Pulpex P AD-HR, (polypropylene fibre) was added, and stirred in. Seven and one-half percent by weight of isobutyl alcohol was added to achieve the final composition. The plastic roof cement composition was tested in accordance with ASTM method D-2822 with the following results:

| | |
|---|---|
| Water | 0% |
| Nonvolatile matter | 86% |
| Fibre and mineral stabilizer | 27% |
| Asphalt | 57% |
| Mineral matter based on original mass of insoluble residue | 86% |
| Uniformity after 72 h | No solvent separation |
| Workability at 10° C. | passes |
| Behavior at 60° C. | passes |
| Pliability at 0° C. | passes |

Similar formulations may be produced using other bulking agents or fillers, such as asbestos fibre, polyethylene fibres, etc.

SUMMARY

The examples given above in the twelve sections describe various synthetic asphalt products or mixtures. The basic products, without additives, comprise mixtures of gilsonite and tall oil products, either tall oil or tall oil pitch, in varying proportions, depending on the desired characteristics of the synthetic asphalt end product.

Some of the mixtures include tall oil. Tall oil may be used either in place of, or in addition to, the tall oil pitch, if desired. If tall oil is used in place of tall oil pitch, less tall oil, quantitatively, will be used than tall oil pitch due to the lower viscosity of tall oil. However, the cost of tall oil is substantially greater than that of tall oil pitch, which increases the cost of the synthetic asphalt product. In some situations, an "either-or" condition may exist, and in other situations, a combination condition may exist where it may be preferable to use both tall oil and tall oil pitch.

Various additives may be used with the basic gilsonite-tall oil product, the synthetic asphalt, to provide the desired characteristics in the end product. In the examples given herein, four primary additives are discussed. The additives include aggregate, petroleum asphalt, reclaimed rubber, and alcohols.

In addition, emulsifying agents may be used with the synthetic asphalt, as particularly described in Sections IV, V, VIII, IX and X, just as they may be used with petroleum asphalts. The emulsifying agents may be used along with an additive, or with more than one additive, as described in the examples given in the several sections, to provide the desired properties in the synthetic asphalt end product. Six different types of emulsifiers are discussed in the above-given examples. Bentonite clay, used with chromic acid, is a mineral colloidal emulsifier.

What is claimed is:

1. A synthetic asphalt composition, consisting of a mixture of gilsonite and a tall oil product.

2. The composition of claim 1 in which the tall oil product comprises tall oil pitch.

3. The composition of claim 1 in which the tall oil product comprises tall oil.

4. The composition of claim 1 in which the tall oil product comprises a mixture of tall oil and tall oil pitch.

5. A modified synthetic asphalt composition consisting of a mixture of gilsonite, a tall oil product, and additive material for modifying the composition to provide desired properties selected from the group consisting of aggregate, petroleum asphalt, and reclaimed rubber.

6. The composition of claim 5 in which the tall oil product comprises tall oil pitch.

7. The composition of claim 6 which includes a further additive comprising an emulsifying agent.

8. A modified synthetic asphalt composition consisting of a mixture of gilsonite, a tall oil product, and an alcohol.

9. The composition of claim 8 which includes aggregate.

10. The composition of claim 8 which includes fibre binder.

11. The composition of claim 8 in which the alcohol includes monohydric alcohols.

12. The composition of claims 8 or 11 in which the alcohol includes polyhydric alcohols.

13. An asphalt recycling composition consisting of a mixture of tall oil pitch and additive material selected from a group consisting of tall oil, gilsonite, and petroleum asphalt.

14. The composition of claim 12 which includes a further additive comprising an emulsifying agent.

15. The composition of claim 12 or 13 which includes a further additive comprising aggregate.

16. The process of preparing synthetic asphalt, consisting of the step of mixing gilsonite and tall oil pitch.

17. The process of claim 16 which includes the step of agitating the mixture of gilsonite and tall oil pitch.

18. The process of claim 17 which further includes the step of crushing the gilsonite to a particle size of less than 850 microns prior to mixing the gilsonite and tall oil pitch.

19. The process of claim 13 which further includes the step of adding material selected from the group consisting of aggregate, petroleum asphalt, reclaimed rubber, and alcohol to the mixture of gilsonite and tall oil pitch.

20. The process of claim 15 which further includes the step of adding an emulsifying agent to the mixture.

* * * * *

UNITED STATES PATENT AND TRADEMARK OFFICE
CERTIFICATE OF CORRECTION

PATENT NO. : 4,437,896
DATED : March 20, 1984
INVENTOR(S) : JOHN E. PARTANEN

It is certified that error appears in the above-identified patent and that said Letters Patent are hereby corrected as shown below:

Name of the inventor should be "JOHN E. PARTANEN" instead of "JOHN F. PARTANEN" as it appears on patent.

Signed and Sealed this

Twenty-third Day of December, 1986

*Attest:*

DONALD J. QUIGG

*Attesting Officer*     *Commissioner of Patents and Trademarks*

UNITED STATES PATENT AND TRADEMARK OFFICE
CERTIFICATE OF CORRECTION

PATENT NO. : 4,437,896
DATED : March 20, 1984
INVENTOR(S) : John E. Partanen

It is certified that error appears in the above-identified patent and that said Letters Patent is hereby corrected as shown below:

In column 21, line 5, please delete "12", and insert therefor -- 13 --.

In column 21, line 7, please delete "12 or 23", and insert therefor -- 13 or 14 --.

In column 22, line 5, please delete "13", and insert therefor -- 16 --.

In column 22, line 10, please delete "15", and insert therefor -- 16 --.

Signed and Sealed this

Eleventh Day of August 1998

*Attest:*

BRUCE LEHMAN

*Attesting Officer*  *Commissioner of Patents and Trademarks*